(12) United States Patent
Sakai

(10) Patent No.: US 6,983,098 B1
(45) Date of Patent: Jan. 3, 2006

(54) MAGNETIC MEDIUM RECORDING AND REPRODUCING APPARATUS

(75) Inventor: Akihira Sakai, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 532 days.

(21) Appl. No.: 10/129,613

(22) PCT Filed: Nov. 9, 2000

(86) PCT No.: PCT/JP00/07857

§ 371 (c)(1),
(2), (4) Date: Aug. 9, 2002

(87) PCT Pub. No.: WO01/35653

PCT Pub. Date: May 17, 2001

(51) Int. Cl.
*H04N 5/78* (2006.01)

(52) U.S. Cl. .................................. 386/46; 386/131
(58) Field of Classification Search .................. 386/46, 386/95, 112, 117, 131; 348/390.1, 705
See application file for complete search history.

(56) References Cited

U.S. PATENT DOCUMENTS 5,563,661 A * 10/1996 Takahashi et al. ........ 348/390.1
6,292,229 B1 * 9/2001 Meyer ....................... 348/705

FOREIGN PATENT DOCUMENTS

| EP | 0 823 817 | 2/1998 |
|---|---|---|
| JP | 3-177176 | 8/1991 |
| JP | 5-30462 | 2/1993 |
| JP | 6-334961 | 12/1994 |
| JP | 7-135635 | 5/1995 |
| JP | 7-230666 | 8/1995 |
| JP | 7-284056 | 10/1995 |

OTHER PUBLICATIONS

Tomita Masao, et al., entitled *"Video Tape Recorder With Digital Television Standards Converter"*, IEEE Transactions on Consumer Electronics, IEEE Inc. New York, US, vol. 36, No. 3, Aug. 1, 1990, pp. 572–579, XP000162892.

* cited by examiner

*Primary Examiner*—Huy Nguyen
(74) *Attorney, Agent, or Firm*—Wenderoth, Lind & Ponack, L.L.P.

(57) ABSTRACT

In a videotape recording and reproducing apparatus, when picture signals of the high definition (HD) TV system are reproduced, the picture signals of the HDTV system are fed into a HDTV system output terminal. In addition, a controller operates a down converter in response to a signal from a format determiner, to down-convert the signals into picture signals of the NTSC system or the PAL system, and outputs the converted signals to a NTSC system or a PAL system output terminal. On the other hand, when picture signals of the NTSC system or the PAL system are reproduced, the picture signals of the NTSC system or the PAL system are fed into the NTSC system or the PAL system output terminal. In addition, the controller operates an up converter in response to a signal from the format determiner, to up-convert the signals into picture signals of the HDTV system, and outputs the converted signals to the HDTV system output terminal.

6 Claims, 6 Drawing Sheets

MAGNETIC MEDIUM RECORDING AND REPRODUCING APPARATUS

FIELD OF THE INVENTION

The present invention relates to an apparatus for recording and reproducing picture signals on and from a magnetic medium, and particularly to a magnetic medium (videotape) recording and reproducing apparatus capable of reproducing picture signals of various formats stored on the videotape.

BACKGROUND OF THE INVENTION

As a standard system of television, so-called "NTSC (National Television System Committee) system" (hereinafter referred to as "NTSC system") is employed in Japan and other countries. The SMPTE standard 170M and 259M define this system.

On the other hand, nowadays, the High Definition Television Systems (hereinafter referred to as "HDTV system") is also employed and used for part of television broadcast. The SMPTE standard 292M, 260M and 274M define this system.

Therefore, picture signals stored on a magnetic medium (e.g. a videotape for a broadcasting station) for recording picture and voice data on a broadcast from a television broadcasting station have various formats so as to be adapted to the above-mentioned systems. Among these formats is a picture signal format corresponding to the NTSC system defined by the SMPTE 170M.

Picture signals of the NTSC system are generally fed into a dedicated apparatus capable of outputting picture signals of the NTSC system for display. Similarly, picture signals of the HDTV system are generally fed into a dedicated apparatus capable of outputting picture signals of the HDTV system for display. Therefore, when picture signals of the HDTV system are fed into a dedicated apparatus capable of outputting picture signals of the NTSC system for display, the picture signals of the HDTV system are converted into those of the NTSC system by a down converter and fed into a dedicated apparatus capable of outputting picture signals of the NTSC system for display.

To the contrary, when picture signals of the NTSC system are fed into a dedicated apparatus capable of outputting picture signals of the HDTV system for display, the picture signals of the NTSC system are converted into those of the HDTV system by an up converter and fed into a dedicated apparatus capable of outputting picture signals of the HDTV system for display.

SUMMARY OF THE INVENTION

It is an essential object of the present invention to provide a magnetic medium recording and reproducing apparatus. In the apparatus, a format determiner automatically determines a format of picture signals stored on a videotape, on the basis of attributes provided with the videotape set in the apparatus. In accordance with the determination by the format determiner, the apparatus, as required, automatically operates a down converter or an up converter related to the picture signals, and causes the picture signals to be displayed.

The multi-format magnetic medium recording and reproducing apparatus in accordance with the present invention, having a function of reproducing first and second picture signals compatibly, has a down converter for converting the first picture signals to the second picture signals, an up converter for converting the second picture signals to the first picture signals, a first delay circuit to delay the first picture signals, a second delay circuit to delay the second picture signals, a first output terminal capable of outputting the first picture signals, a second output terminal capable of outputting the second picture signals, a format determiner for determining a format of picture signals to be reproduced, and a controller.

The first picture signal may be a picture signal of the HDTV system defined by the SMPTE 292M, SMPTE 260M, or SMPTE 274M and the second picture signal may be a picture signal of the NTSC system or the PAL system defined by the SMPTE 170M or SMPTE 259M, or a picture signal of the 525P progressive scanning TV system defined by the SMPTE 293M or SMPTE 294M.

It is also preferable that the format determiner determines a format from format data recorded on a magnetic medium or a shape of a cassette.

In addition, it is preferable that, when said first picture signals are reproduced, the first picture signals are fed through the first delay circuit and are fed into the first output terminal and, in response to a signal from the format determiner, the controller operates the down converter so as to down-convert the first picture signals to the second picture signals and feeds the converted signals into the second output terminal, so as to synchronize the outputs at the first output terminal with the outputs at the second output terminal. It is also preferable that, when the second picture signals are reproduced, the second picture signals are fed through the second delay circuit and are fed into the second output terminal and, in response to a signal from the format determiner, the controller operates the up converter so as to up-convert the second picture signals to the first picture signals and feeds the converted signals into the first output terminal, so as to synchronize the outputs at the second output terminal with the outputs at the first output terminal.

Format information may be fed into the first or second output terminal in response to a signal from the format determiner.

When the recording format of a magnetic medium set in the apparatus for a reproducing operation is different from the recording format instructed to the apparatus for a recording operation, the controller may output a warning to the first or second output terminal. When the recording format of a magnetic medium set in the apparatus for a reproducing operation is different from the recording format instructed to the apparatus for a reproducing operation, the controller may output a warning to the first or second output terminal and a display unit.

In addition, when the controller determines the down converter is abnormal, fixed pattern signals can be transmitted to the second output terminal at the reproduction of the first picture signals.

When the controller determines the up converter is abnormal, fixed pattern signals can be transmitted to the first output terminal at the reproduction of the second picture signals.

With a magnetic medium recording and reproducing apparatus provided in accordance with the present invention, the format of the picture signals stored on a videotape set in the apparatus is automatically determined through a format determiner on the basis of attributes provided with the videotape. This allows the down converter or up converter related to the picture signals to be automatically operated and the picture signals to be displayed. Even though a plurality of the picture signals to be displayed are provided and each of them is related to each picture signal system, it is possible for those signals to be synchronized.

When the format of the picture signals stored on a videotape does not correspond with the format instructed by the operation unit, a warning can be displayed on the display unit.

In addition, when the up converter or down converter has any abnormality, display of a picture can be avoided.

DETAILED DESCRIPTION OF THE PREFERRED EMBODIMENTS

Figure 1:
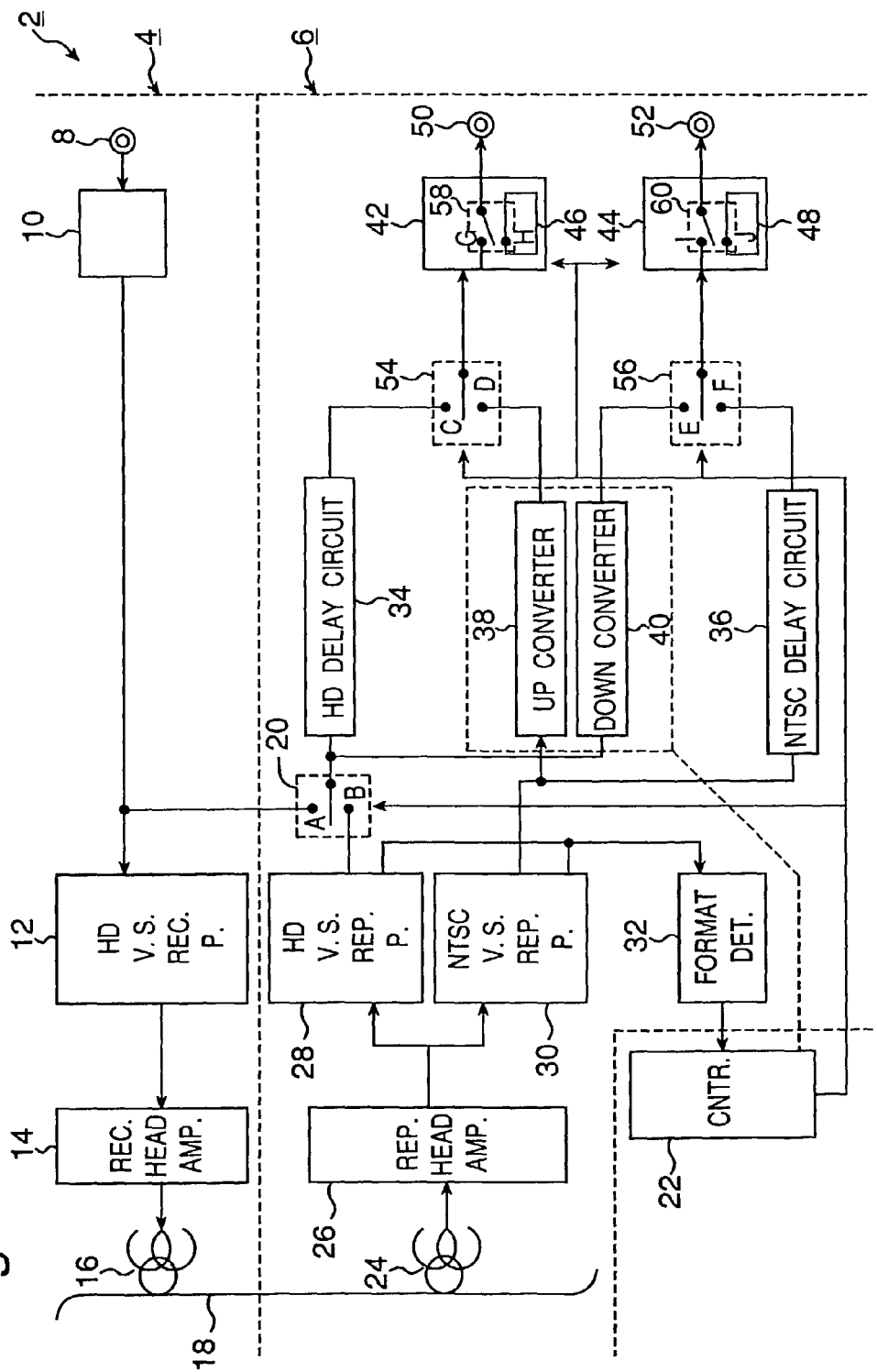
FIG. 1 is a block diagram of a multi-format videotape recording and reproducing apparatus in accordance with a first embodiment of the present invention.

Embodiments in accordance with the present invention are hereinafter demonstrated with reference to the accompanying drawings. FIG. 1 is a block diagram of a multi-format videotape recording and reproducing apparatus 2 in accordance with a first embodiment of the present invention. The apparatus 2 includes a recording unit 4 and a reproducing unit 6.

The recording unit 4 employs a conventional technique. The recording unit 4 has a picture signal input terminal 8, an input interface 10, a high definition (HD) video signal recording processor 12, a recording head amplifier 14 and a recording head 16. In the apparatus 2, picture signals of the HDTV system are input from the picture signal input terminal 8. The picture signals supplied from the picture signal input terminal 8 go through the input interface 10 and the HD video signal recording processor 12, and are sequentially adjusted by the recording head amplifier 14, and then recorded on a videotape 18 by the recording head 16.

Figure 2:
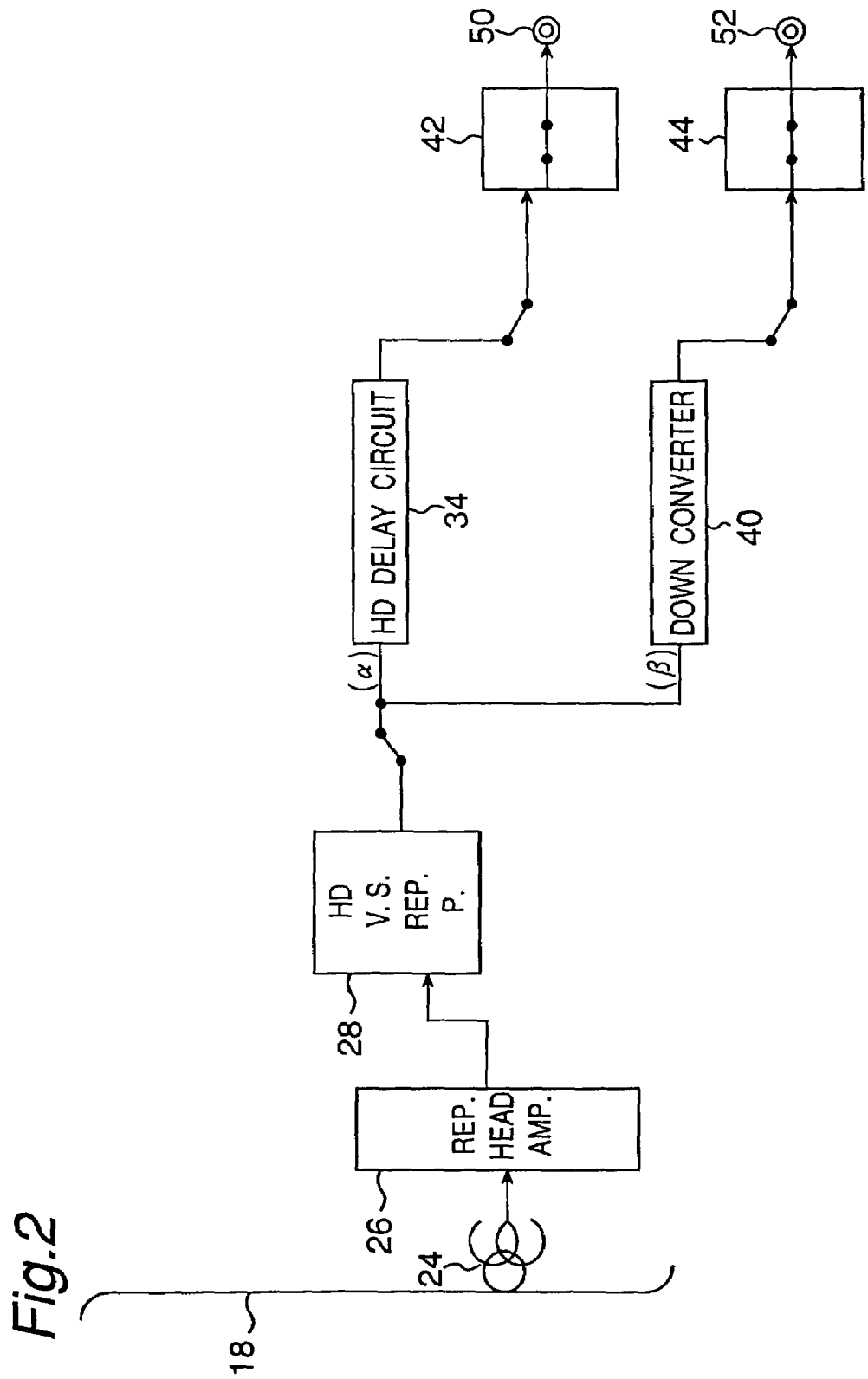
FIG. 2 is a block diagram of the components actually operating when a videotape storing picture signals of the HDTV system are reproduced in accordance with the first embodiment.

The picture signals which go through the input interface 10 are also fed into the reproducing unit 6. When an operation unit (not shown) instructs the apparatus 2 to perform a recording operation, a controller 22 connects a first switch 20 to the output side of the recording unit 4, i.e., the B terminal. The input picture signals fed into the reproducing unit 6 at this time are picture signals of the HDTV system. Therefore, the controller 22 (described later) allows a circuit for reproducing picture signals of the HDTV system to be formed in the reproducing unit 6 as shown in FIG. 2, so that the picture signals are reproduced. The reproducing operation in the reproducing unit 6 and the circuit of FIG. 2 are described later.

The reproducing unit 6 is substantially provided with the following components:
a reproducing head 24; a reproducing head amplifier 26;
a high definition video signal reproducing processor 28; an NTSC video signal reproducing processor 30; a format determiner 32;
a high definition delay circuit 34; an NTSC delay circuit 36; an up converter 38, a down converter 40;
the first switch 20; a second switch 54; a third switch 56;
a first output interface 42; a second output interface 44; a high definition fixed pattern generator 46; an NTSC fixed pattern generator 48; a fourth switch 58, a fifth switch 60;
a first picture output terminal 50; and a second picture output terminal 52.

In this manner, the reproducing unit 6 has substantially a similar construction as a conventional videotape reproducing apparatus. However, this reproducing unit is constructed so that it can reproduce any videotape that stores picture signals of one of the following systems: the HDTV system defined by the SMPTE 292M, SMPTE 260M, or SMPTE 274M; the NTSC system or the PAL system defined by the SMPTE 170M or SMPTE 259M; and the 525P progressive scanning TV system defined by the SMPTE 293M or SMPTE 294M. Specifically, the first picture output terminal 50 is constructed so as to output picture signals of the above-mentioned HDTV system and the second picture output terminal 52 is constructed so as to output picture signals of the above-mentioned NTSC system, PAL system or progressive scanning TV system.

The process of feeding picture signals recorded on the videotape 18 into the above-mentioned first and second picture signal output terminals is described below.

Picture signals that have been read out from the reproducing head 24, have gone through and have been adjusted by the reproducing head amplifier 26 are transmitted to the HD video signal reproducing processor 28 and NTSC video signal reproducing processor 30.

The picture signals transmitted to the HD video signal reproducing processor 28 and NTSC video signal reproducing processor 30 include data related to the format thereof. The apparatus of this embodiment utilizes the data. Among a frame of data constituting picture signals, format information is held in its non-picture data portion. The format determiner 32 reads out the format information and determines the format of the picture signals stored on the videotape. The format information obtained by the format determiner 32 is transmitted to the controller 22.

The information obtained by the format determiner 32 can be transmitted to the first picture signal output terminal 50 and/or the second picture signal output terminal 52, through paths (not shown) and via the first output interface 42 or the second output interface 44, and can be displayed on a display unit (not shown), as required.

The controller 22 switches the paths according to the format information using several switches; i.e.,
the first switch 20;
the second switch 54;
the third switch 56;
the fourth switch 58; and
the fifth switch 60.

(1) When the format of picture signals corresponds to the HDTV system defined by the SMPTE 292M, SMPTE 260M, or SMPTE 274M, in response to an instruction signal from the controller 22, the following connections are made:

the first switch 20 to the B terminal;
the second switch 54 to the C terminal;
the third switch 56 to the E terminal;
the fourth switch 58 to the G terminal; and
the fifth switch 60 to the I terminal.

These connecting operations form a circuit shown in FIG. 2.

In the circuit shown in FIG. 2, picture signals of the HDTV system that have undergone a predetermined processing in the HD video signal reproducing processor 28 are transmitted to the HD delay circuit 34 in the path (α) and to the down converter 40 in the path (β).

The down converter 40 is a circuit that converts picture signals of the HDTV system defined by the SMPTE 292M, SMPTE 260M, or SMPTE 274M into those of the NTSC system or the PAL system defined by the SMPTE 170M or SMPTE 259M, or those of the 525P progressive scanning TV system defined by the SMPTE 293M or SMPTE 294M. Data to be reproduced that has been converted by the down converter 40 into picture signals of the NTSC system, the PAL system or the progressive scanning TV system are transmitted, via the second output interface 44, to the second picture signal output terminal 52 that is constructed so as to output picture signals of the NTSC system, the PAL system or the progressive scanning TV system.

On the other hand, the picture signals of the HDTV system in the path (α) are finally transmitted to the first picture signal output terminal 50 that outputs picture signals of the HDTV system outside. However, on the way to the output terminal 50, the signals go through the high definition (HD) delay circuit 34 and the first output interface 42. The HD delay circuit 34 is disposed so as to synchronize the picture signals fed into the first picture signal output terminal 50 with those transmitted from the down converter 40 to the second picture signal output terminal 52 in the path (β). Since a predetermined time delay occurs when the down converter 40 performs down conversion, this HD delay circuit 34 is necessary.

In this manner, picture signals of the HDTV system and those of the NTSC system, the PAL system or the progressive scanning TV system synchronized with each other are supplied from the first picture signal output terminal 50 and the second picture signal output terminal 52.

Figure 3:
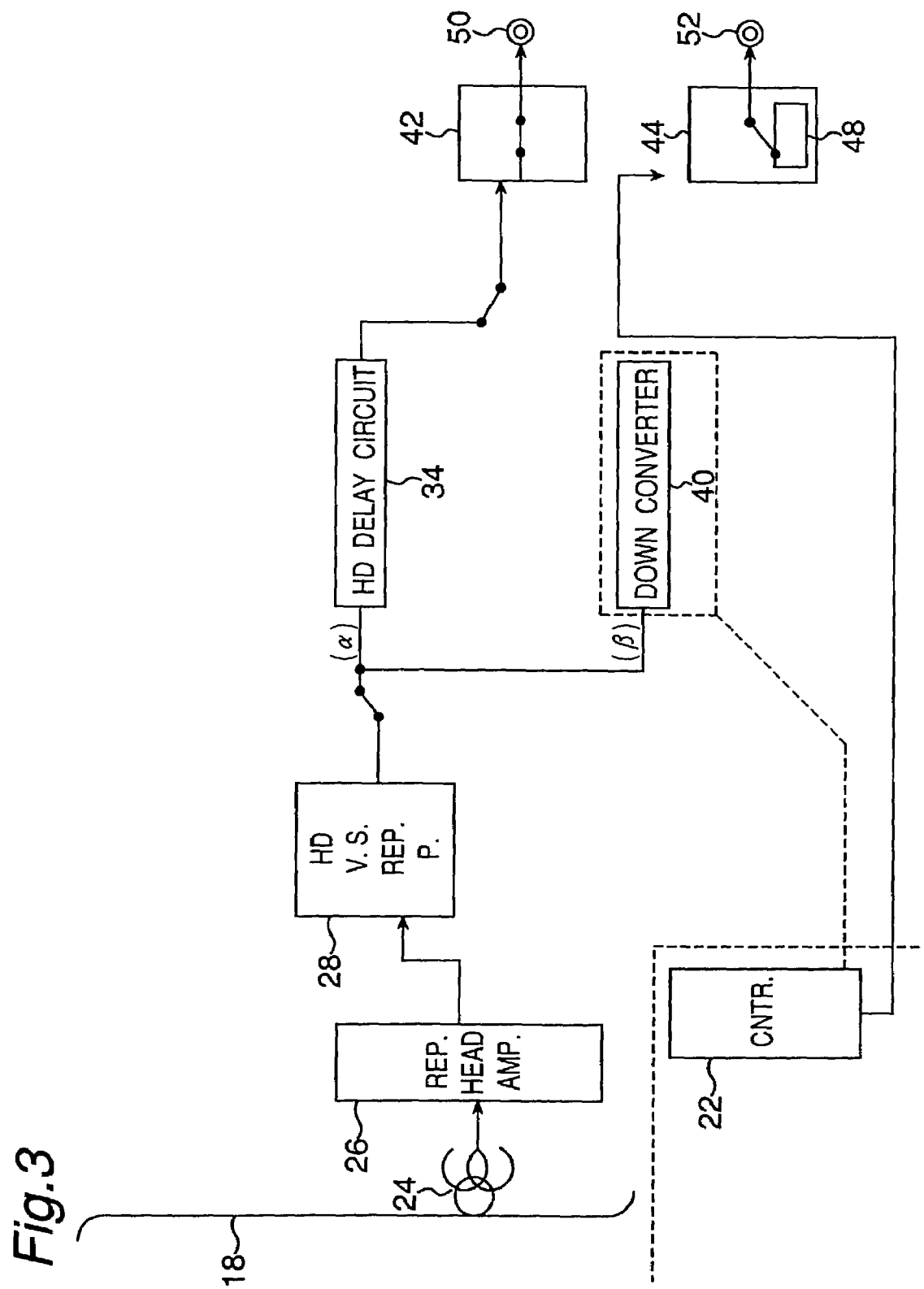
FIG. 3 is a block diagram of the components actually operating when a videotape storing picture signals of the HDTV system are reproduced and the down converter has abnormalities, in accordance with the first embodiment.

The videotape recording and reproducing apparatus 2 in accordance with the first embodiment is also set so that its controller 22 detects when no output signal is supplied from the down converter 40 or when the output signals from the down converter 40 have abnormalities. As shown in FIG. 3, when the controller 22 detects those abnormalities, the fifth switch 60 disconnects from the I terminal and connects to the J terminal. This operation connects the second picture signal output terminal 52 to NTSC fixed pattern generator 48 that feeds a fixed pattern picture into a display of the NTSC system (not shown) and the second picture signal output terminal 52 continuously receives the fixed pattern pictures.

(2) When the format of picture signals corresponds to the NTSC system or the PAL system defined by the SMPTE 170M or SMPTE 259M, or the 525P progressive scanning TV system defined by the SMPTE 293M or SMPTE 294M, in response to an instruction signal from the controller 22, the following connections are made in FIG. 1:
the second switch 54 to the D terminal;
the third switch 56 to the F terminal;
the fourth switch 58 to the G terminal; and
the fifth switch 60 to the I terminal.

Figure 4:
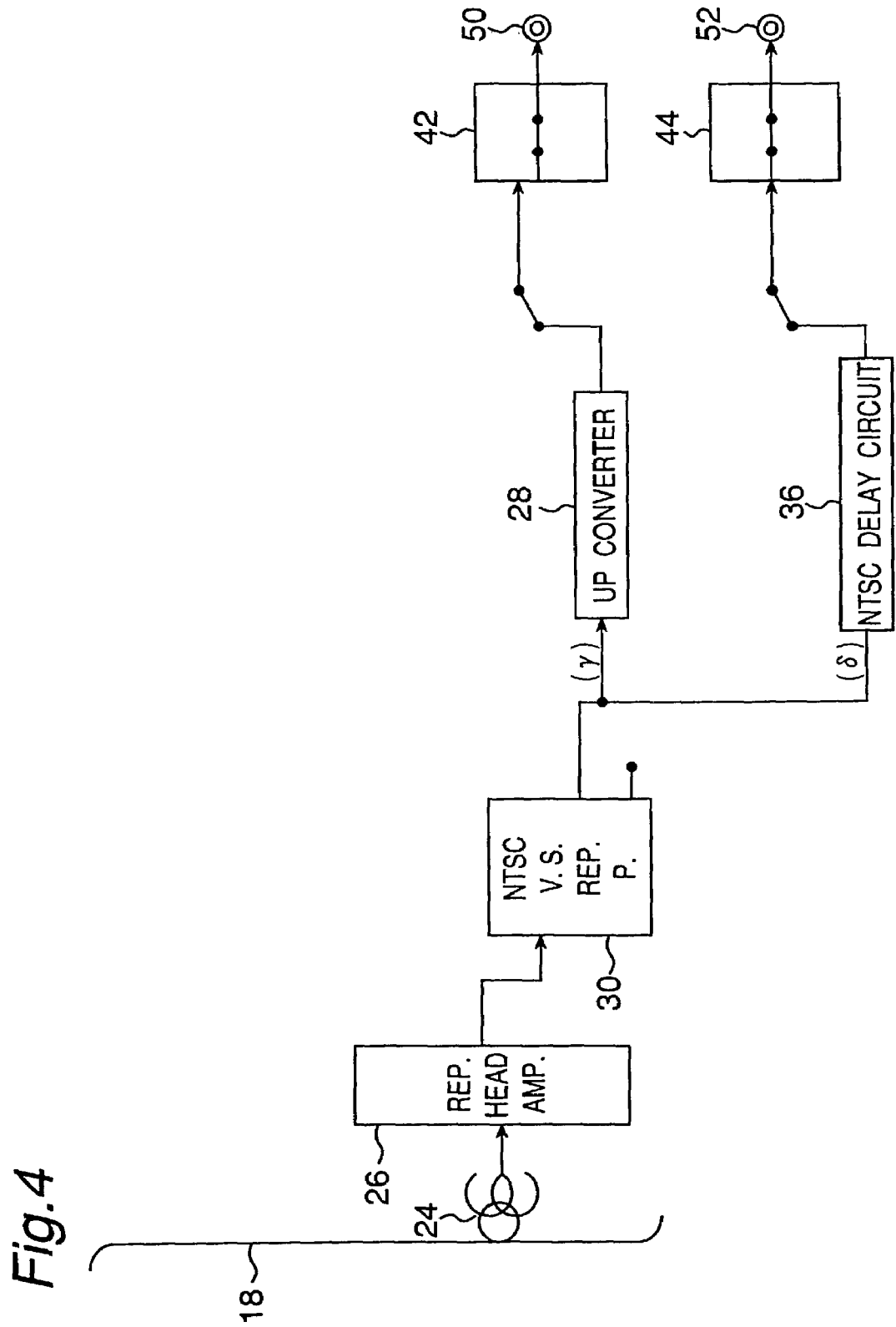
FIG. 4 is a block diagram of the components actually operating when a videotape storing picture signals of the NTSC system, the PAL system or the progressive scanning system are reproduced in accordance with the first embodiment.

These connecting operations form a circuit shown in FIG. 4.

In the circuit shown in FIG. 4, picture signals of the NTSC system, the PAL system or the progressive scanning TV system that have undergone a predetermined processing in NTSC video signal reproducing processor 30 are transmitted to the up converter 38 in the path (γ) and to the NTSC delay circuit 36 in the path (δ).

The up converter 38 is a circuit that converts picture signals of the NTSC system or the PAL system defined by the SMPTE 170M or SMPTE 259M, or those of the 525P progressive scanning TV system defined by the SMPTE 293M or SMPTE 294M into those of the HDTV system defined by the SMPTE 292M, SMPTE 260M, or SMPTE 274M. Data to be reproduced that has been converted by the up converter 38 into picture signals of the HDTV system are transmitted, via the first output interface 42, to the first picture signal output terminal 50 that is constructed so as to output picture signals of the HDTV system.

On the other hand, the picture signals of the NTSC system, the PAL system or the progressive scanning TV system in the path (δ) are transmitted to the second picture signal output terminal 52 that outputs picture signals of the NTSC system, the PAL system or the progressive scanning TV system outside. However, on the way to the output terminal, the signals go through NTSC delay circuit 36 and the second output interface 44. NTSC delay circuit 36 is disposed so as to synchronize the picture signals fed into the second picture signal output terminal 52 with those transmitted from the up converter 38 to the first picture signal output terminal 50 in the path (γ). Since a predetermined time delay occurs when the up converter 38 performs up conversion, this NTSC delay circuit 36 is necessary.

In this manner, also in the case (2), picture signals of the HDTV system and those of the NTSC system, the PAL system or the progressive scanning TV system synchronized with each other are supplied from the first picture signal output terminal 50 and the second picture signal output terminal 52.

Figure 5:
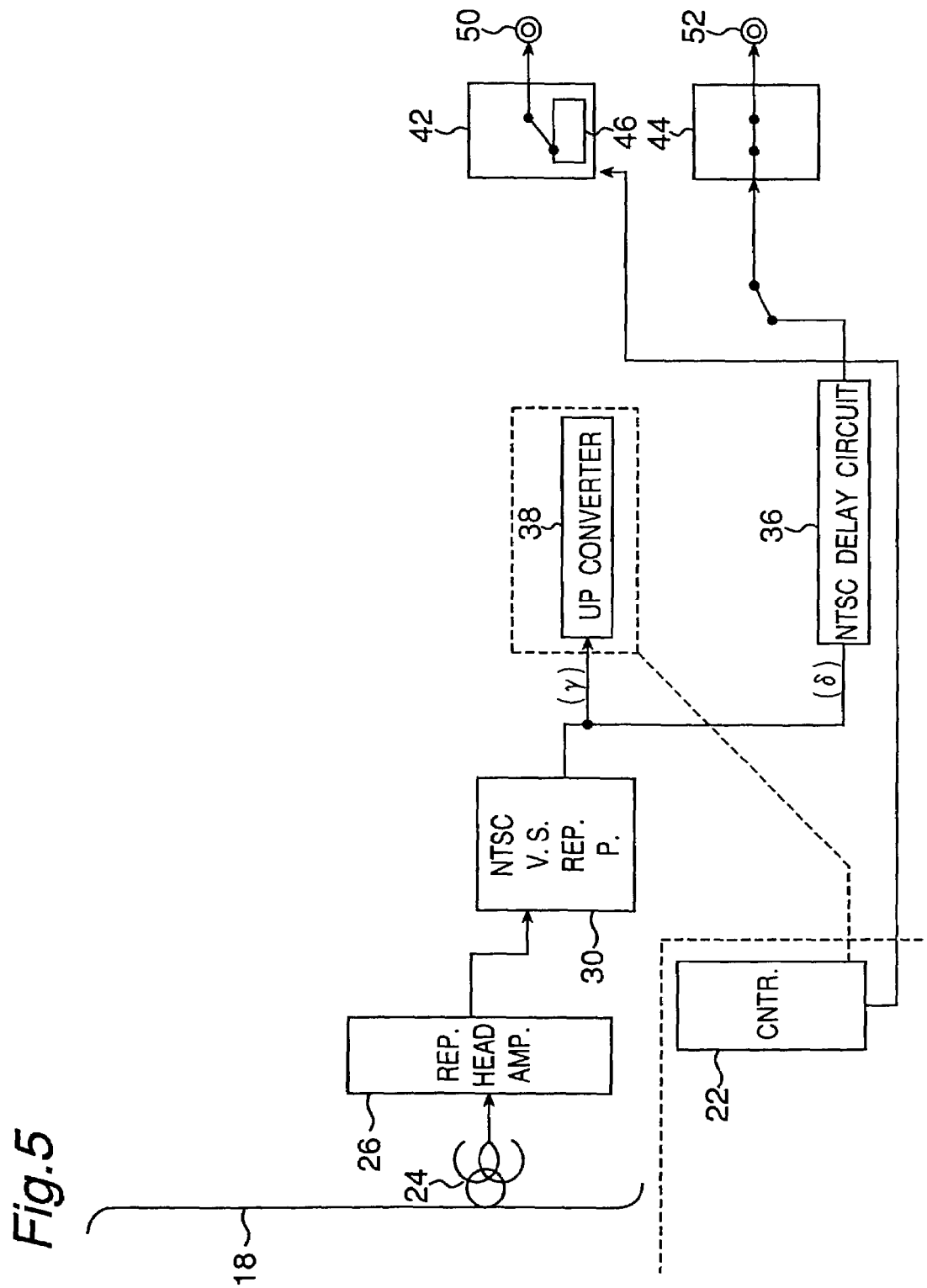
FIG. 5 is a block diagram of the components actually operating when a videotape storing picture signals of the NTSC system the PAL system or the progressive scanning system are reproduced and the up converter has abnormalities, in accordance with the first embodiment.

The videotape recording and reproducing apparatus 2 in accordance with the first embodiment is also set so that its controller 22 detects when no output signal is supplied from the up converter 38 or when the output signals from the up converter 38 have abnormalities. As shown in FIG. 5, when the controller 22 detects those abnormalities, the fourth switch 58 disconnects from the G terminal and connects to the H terminal. This operation connects the first picture signal output terminal 50 to the HD fixed pattern generator 46 that feeds a fixed picture pattern into a display of the HDTV system (not shown) and the first picture signal output terminal 50 continuously receives the fixed pattern pictures.

Figure 6:
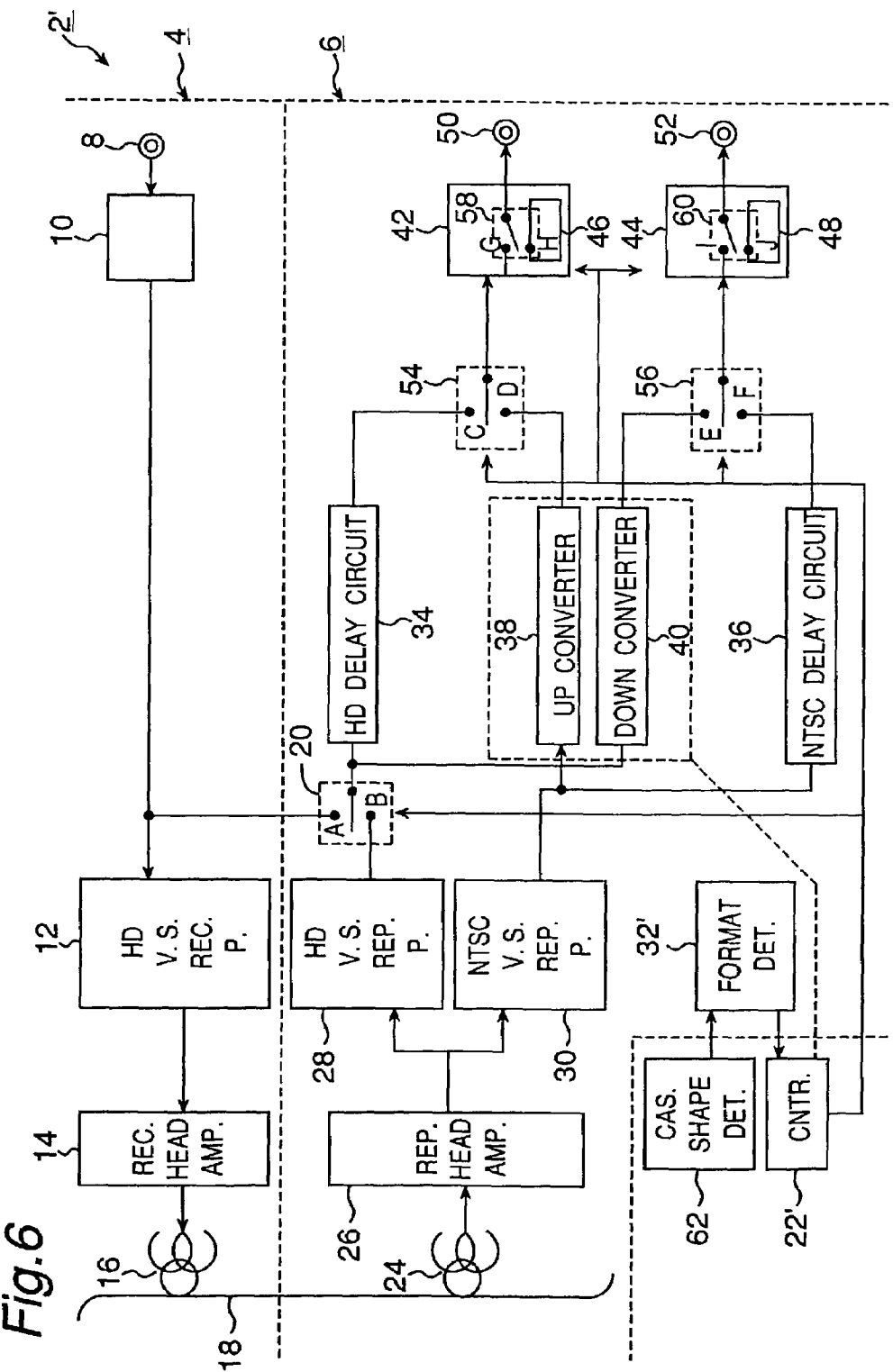
FIG. 6 is a block diagram of a multi-format videotape recording and reproducing apparatus in accordance with a second embodiment of the present invention.

FIG. 6 is a block diagram of a multi-format videotape recording and reproducing apparatus 2' in accordance with a second exemplary embodiment of the present invention. The multi-format videotape recording and reproducing apparatus 2' of the second embodiment has substantially a similar structure as that of the first embodiment. Therefore, the same elements are denoted with the same reference numerals and description is given mainly for different elements.

As mentioned above, with the apparatus in accordance with the first embodiment, the format determiner 32 determines the format of picture signals to be recorded on a videotape on the basis of data related to the format included in the picture signals. On the other hand, with the apparatus in accordance with the second embodiment, a format determiner 32' determines the format on the basis of the shape of a cassette having a videotape.

In accordance with this embodiment, (part of) the external shape of a cassette is determined in correspondence with the format of picture signals to be recorded on the videotape. The external shape of the cassette is, for example, a so-called "lug" of the cassette.

A cassette shape determiner 62 provided in the apparatus in accordance with the second embodiment determines the external shape of a cassette and transmits the obtained information to the format determiner 32' as a signal. The format determiner 32' determines a format from the signal.

Basic information the format determiner uses for the format determination is not limited to the above-mentioned two elements. For example, an operation unit (not shown) of the multi-format videotape recording and reproducing apparatus can be constructed so that it can designate a format and the format designated from the operation unit can be adopted as the determination of the format determiner at the actual reproducing operation.

In the description of the above-mentioned first and second embodiments, the controller 22 uses the format information generated by the format determiner 32 and 32' to control conversion and output of picture signals. The format information generated by the format determiner 32 can also be used for other applications.

For example, the apparatus can be set so that the controller 22 gives a warning to a display unit (not shown) when the recording format of a videotape set in the videotape recording and reproducing apparatus for reproducing operation is different from the recording format instructed to the apparatus for recording operation immediately after the reproducing operation.

In addition, the apparatus can be set so that controller 22 gives a warning to the display unit (not shown) when the recording format of a videotape set in the videotape recording and reproducing apparatus for reproducing operation is different from the format instructed from the operation unit of the apparatus.

What is claimed is:

1. A multi-format magnetic medium recording and reproducing apparatus with a function of reproducing first picture signals and second picture signals compatibly, said multi-format magnetic medium recording and reproducing apparatus comprising:
    a down converter operable to convert the first picture signals to the second picture signals;
    an up converter operable to convert the second picture signals to the first picture signals;
    a first delay circuit operable to delay the first picture signals;
    a second delay circuit operable to delay the second picture signals;
    a first output terminal capable of outputting the first picture signals;
    a second output terminal capable of outputting the second picture signals;
    a format determiner operable to determine a format of picture signals to be reproduced; and
    a controller;
    wherein the first picture signals are picture signals of a high definition television (HDTV) system defined by SMPTE 292M, SMPTE 260M or SMPTE 274M;
    wherein the second picture signals are picture signals of an NTSC system or a PAL system defined by SMPTE 170M or SMPTE 259M, or a 525P progressive scanning TV system defined by SMPTE 293M or SMPTE 294M;
    wherein said format determiner determines a format on a basis of format data stored on a magnetic medium, or on a basis of a shape of a cassette;
    wherein,
    when the first picture signals are reproduced,
    the first picture signals are fed through said first delay circuit and are fed into said first output terminal;
    said controller operates said down converter in response to a signal from said format determiner; and
    the first picture signals are down-converted to the second picture signals and fed into said second output terminal,
    so as to synchronize the outputs at said first output terminal with the outputs at said second output terminal.

2. A multi-format magnetic medium recording and reproducing apparatus with a function of reproducing first picture signals and second picture signals compatibly, said multi-format magnetic medium recording and reproducing apparatus comprising:
    a down converter operable to convert the first picture signals to the second picture signals;
    an up converter operable to convert the second picture signals to the first picture signals;
    a first delay circuit operable to delay the first picture signals;
    a second delay circuit operable to delay the second picture signals;
    a first output terminal capable of outputting the first picture signals;
    a second output terminal capable of outputting the second picture signals;
    a format determiner operable to determine a format of picture signals to be reproduced; and
    a controller;
    wherein the first picture signals are picture signals of a high definition television (HDTV) system defined by SMPTE 292M SMPTE 260M or SMPTE 274M;
    wherein the second picture signals are picture signals of an NTSC system or a PAL system defined by SMPTE 170M or SMPTE 259M or a 525P progressive scanning TV system defined by SMPTE 293M or SMPTE 294M;
    wherein said format determiner determines a format on a basis of format data stored on a magnetic medium, or on a basis of a shape of a cassette;
    wherein,
    when the second picture signals are reproduced,
    the second picture signals are fed through said second delay circuit and are fed into said second output terminal;
    said controller operates said up converter in response to a signal from said format determiner; and
    the second picture signals are up-converted to the first picture signals and fed into said first output terminal,
    so as to synchronize the outputs at said second output terminal with the outputs at said first output terminal.

3. A multi-format magnetic medium recording and reproducing apparatus with a function of reproducing first picture signals and second picture signals compatibly, said multi-format magnetic medium recording and reproducing apparatus comprising:
    a down converter operable to convert the first picture signals to the second picture signals;
    an up converter operable to convert the second picture signals to the first picture signals;
    a first delay circuit operable to delay the first picture signals;
    a second delay circuit operable to delay the second picture signals;
    a first output terminal capable of outputting the first picture signals;

a second output terminal capable of outputting the second picture signals;

a format determiner operable to determine a format of picture signals to be reproduced; and a controller;

wherein the first picture signals are picture signals of a high definition television (HDTV system defined by SMPTE 292M SMPTE 260M or SMPTE 274M;

wherein the second picture signals are picture signals of an NTSC system or a PAL system defined by SMPTE 170M or SMPTE 259M, or a 525P progressive scanning TV system defined by SMPTE 293M or SMPTE 294M;

wherein said format determiner determines a format on a basis of format data stored on a magnetic medium, or on a basis of a shape of a cassette; and wherein, when a recording format of a magnetic medium set in the apparatus for a reproducing operation is different from a recording format instructed to the apparatus for a recording operation, said controller provides a warning to said first output terminal or said second output terminal.

4. A multi-format magnetic medium recording and reproducing apparatus with a function of reproducing first picture signals and second picture signals compatibly, said multi-format magnetic medium recording and reproducing apparatus comprising:

a down converter operable to convert the first picture signals to the second picture signals;

an up converter operable to convert the second picture signals to the first picture signals;

a first delay circuit operable to delay the first picture signals;

a second delay circuit operable to delay the second picture signals;

a first output terminal capable of outputting the first picture signals;

a second output terminal capable of outputting the second picture signals;

a format determiner operable to determine a format of picture signals to be reproduced; and a controller;

wherein the first picture signals are picture signals of a high definition television (HDTV) system defined by SMPTE 292M SMPTE 260M or SMPTE 274M;

wherein the second picture signals are picture signals of an NTSC system or a PAL system defined by SMPTE 170M or SMPTE 259M or a 525P progressive scanning TV system defined by SMPTE 293M or SMPTE 294M;

wherein said format determiner determines a format on a basis of format data stored on a magnetic medium or on a basis of a shape of a cassette; and wherein, when a recording format of a magnetic medium set in the apparatus for a reproducing operation is different from a recording format instructed to the apparatus for a reproducing operation, said controller provides a warning to a display unit and one of said first output terminal and said second output terminal.

5. A multi-format magnetic medium recording and reproducing apparatus with a function of reproducing first picture signals and second picture signals compatibly, said multi-format magnetic medium recording and reproducing apparatus comprising:

a down converter operable to convert the first picture signals to the second picture signals;

an up converter operable to convert the second picture signals to the first picture signals;

a first delay circuit operable to delay the first picture signals;

a second delay circuit operable to delay the second picture signals;

a first output terminal capable of outputting the first picture signals;

a second output terminal capable of outputting the second picture signals;

a format determiner operable to determine a format of picture signals to be reproduced; and a controller;

wherein, when said controller determines said down converter is abnormal, fixed pattern signals are transmitted to said second output terminal at the reproduction of the first picture signals.

6. A multi-format magnetic medium recording and reproducing apparatus with a function of reproducing first picture signals and second picture signals compatibly, said multi-format magnetic medium recording and reproducing apparatus comprising:

a down converter operable to convert the first picture signals to the second picture signals;

an up converter operable to convert the second picture signals to the first picture signals;

a first delay circuit operable to delay the first picture signals;

a second delay circuit operable to delay the second picture signals;

a first output terminal capable of outputting the first picture signals;

a second output terminal capable of outputting the second picture signals;

a format determiner operable to determine a format of picture signals to be reproduced; and a controller;

wherein, when said controller determines said up converter is abnormal, fixed pattern signals are transmitted to said first output terminal at the reproduction of the second picture signals.

* * * * *

UNITED STATES PATENT AND TRADEMARK OFFICE
CERTIFICATE OF CORRECTION

PATENT NO.   : 6,983,098 B1
DATED        : January 3, 2006
INVENTOR(S)  : Akihira Sakai It is certified that error appears in the above-identified patent and that said Letters Patent is hereby corrected as shown below:

<u>Title page,</u>
Insert Item -- [30] Foreign Application Priority Data
        Nov. 10, 1999     (JP) ………………….. 11-319541 --.

Signed and Sealed this

Thirteenth Day of June, 2006

JON W. DUDAS
*Director of the United States Patent and Trademark Office*